United States Patent
Kanai et al.

(10) Patent No.: US 10,224,807 B2
(45) Date of Patent: *Mar. 5, 2019

(54) POWER CONVERSION APPARATUS AND POWER CONVERSION METHOD FOR HEAT TREATMENT

(71) Applicant: NETUREN CO., LTD., Tokyo (JP)

(72) Inventors: Takahiko Kanai, Tokyo (JP); Masato Sugimoto, Tokyo (JP); Haruki Yoshida, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/578,353

(22) PCT Filed: May 17, 2016

(86) PCT No.: PCT/JP2016/002406
§ 371 (c)(1),
(2) Date: Nov. 30, 2017

(87) PCT Pub. No.: WO2016/203706
PCT Pub. Date: Dec. 22, 2016

(65) Prior Publication Data
US 2018/0175722 A1    Jun. 21, 2018

(30) Foreign Application Priority Data

Jun. 18, 2015 (JP) ................. 2015-123337

(51) Int. Cl.
*H02M 1/32* (2007.01)
*H02M 5/458* (2006.01)
*H05B 6/06* (2006.01)

(52) U.S. Cl.
CPC ............. *H02M 1/32* (2013.01); *H02M 5/458* (2013.01); *H05B 6/06* (2013.01); *H02M 2001/327* (2013.01); *Y02B 70/1483* (2013.01)

(58) Field of Classification Search
CPC .. H02M 1/32; H02M 2001/327; H02M 5/458; H02M 5/4585; H05B 6/06
See application file for complete search history.

(56) References Cited

U.S. PATENT DOCUMENTS 8,918,007 B2 * 12/2014 Tamaoki ............. G03G 15/065
363/132
2003/0214770 A1    11/2003 Schimanek et al.
(Continued)

FOREIGN PATENT DOCUMENTS

EP    0 792 008    8/1997
EP    0 961 379    12/1999
(Continued)

OTHER PUBLICATIONS

International Search Report and Written Opinion of the International Searching Authority, dated Oct. 20, 2016 in corresponding International Patent Application No. PCT/JP2016/002406.
(Continued)

*Primary Examiner* — Timothy J Dole
*Assistant Examiner* — Sisay G Tiku
(74) *Attorney, Agent, or Firm* — Wenderoth, Lind & Ponack, L.L.P.

(57) ABSTRACT

A power conversion apparatus and a power conversion method are provided for heat treatment. The power conversion apparatus includes a rectifier configured to convert AC power to DC power, a smoothing filter configured to control the DC power received from the rectifier to be constant, an inverter configured to convert the DC power received from the smoothing filer into high-frequency power by turning the DC power on and off using a switching device made of an SiC semiconductor, and a control unit configured to control the rectifier and the inverter. A rating of output power output from the inverter is determined in accordance with a frequency of the high-frequency power output from the
(Continued)

inverter, a current-applying time, and an operation rate obtained by dividing the current-applying time by a sum of the current-applying time and a non-current-applying time.

5 Claims, 4 Drawing Sheets

(56) References Cited

U.S. PATENT DOCUMENTS

| | | | |
|---|---|---|---|
| 2010/0155395 A1* | 6/2010 | Suenaga | H05B 6/685 |
| | | | 219/702 |
| 2012/0187107 A1 | 7/2012 | Liu et al. | |
| 2015/0138852 A1* | 5/2015 | Siemaszko | H02M 1/32 |
| | | | 363/50 |
| 2015/0318791 A1* | 11/2015 | Baumann | H02M 5/458 |
| | | | 318/504 |
| 2016/0036317 A1* | 2/2016 | Shimomugi | H02M 1/4225 |
| | | | 363/53 |
| 2016/0172993 A1* | 6/2016 | Yuasa | H02M 5/458 |
| | | | 318/504 |
| 2017/0027025 A1* | 1/2017 | Kanai | H05B 6/06 |

FOREIGN PATENT DOCUMENTS

| | | |
|---|---|---|
| EP | 1 670 289 | 6/2006 |
| EP | 2 779 405 | 9/2014 |
| EP | 3 358 730 | 8/2018 |
| WO | 2014/019860 | 2/2014 |

OTHER PUBLICATIONS

European Office Action dated Nov. 13, 2018 in corresponding European Patent Application No. 16 727 235.0.

* cited by examiner

OPERATION RATE $\alpha = \dfrac{t_p}{\tau} \times 100$ [%]

Fig. 5A      POWER LOSS WAVEFORM

Fig. 5B      POWER LOSS APPLOXIMATION (AVERAGED)

POWER CONVERSION APPARATUS AND POWER CONVERSION METHOD FOR HEAT TREATMENT

TECHNICAL FIELD

The present invention relates to a power conversion apparatus and a power conversion method used for heat treatment.

BACKGROUND ART

Electric resistance heating methods include induction heating and direct resistance heating. In hardening treatment in particular which is one kind of heat treatment using induction heating, a proper frequency is selected according to a heat treatment depth in a workpiece.

According to a related art power conversion apparatus for heat treatment, DC power is converted into high-frequency power by performing switching using a power semiconductor device. In recent years, an SiC-MOSFET made of SiC (silicon carbide) has attracted attention as a switching device for the power semiconductor.

The switching frequency becomes ten times when the oscillatory frequency changes from 10 kHz to 100 kHz. Thus, the temperature rise of the power semiconductor changes greatly. That is, when the capacity (maximum rated value) of an inverter in the power conversion apparatus for heat treatment is determined in accordance with the maximum frequency in an operating range of the apparatus, the temperature rise is uneconomically low for a low output frequency. It is also uneconomical that the temperature rise differs in accordance with a current-applying time per one time as well as in accordance with the operating frequency.

SUMMARY OF INVENTION

Illustrative aspects of the present invention provide an economical power conversion apparatus and an economical power conversion method for heat treatment, capable of changing an output within a rating in accordance with a usage condition.

The power conversion apparatus includes a rectifier configured to convert AC power to DC power, a smoothing filter configured to control the DC power received from the rectifier to be constant, an inverter configured to convert the DC power received from the smoothing filer into high-frequency power by turning the DC power on and off using a switching device made of an SiC semiconductor, and a control unit configured to control the rectifier and the inverter. A rating of output power output from the inverter is determined in accordance with a frequency of the high-frequency power output from the inverter, a current-applying time, and an operation rate obtained by dividing the current-applying time by a sum of the current-applying time and a non-current-applying time.

The control unit may have data defining a relationship among a frequency of the switching device, the current-applying time, the operation rate, and the output power at a temperature at which the switching device is operable. When the current-applying time and the operation rate are given, the control unit calculates a maximum allowable current based on the data and suspends or controls the output power.

The power conversion method includes converting AC power into DC power, converting the DC power into high-frequency power by turning the DC power on and off using a switching device made of an SiC semiconductor, and increasing maximum output power in accordance with a frequency of the high-frequency power, a current-applying time, and an operation rate obtained by dividing the current-applying time by a sum of the current-applying time and a non-current-applying time, such that a junction temperature of the switching device does not exceed a given temperature.

The maximum output power may be increased until an upper limit of the junction temperature of the switching device reaches a designed value within a rating of the switching device, the junction temperature being obtained from a difference between a temperature increase due to a loss of the switching device and a temperature decrease due to cooling of the switching device.

The loss of the switching device may be determined based on a sum of a conduction loss of the switching device and a switching loss of the switching device.

The current-applying time to the switching device may be shorter or longer than a time of replacing and setting a heat treatment target.

According to the invention, rating is defined in accordance with the frequency, the current-applying time and the operation rate. Thus, the output can be increased within the rating of the switching device when the power is converted into a low frequency. It is therefore possible to provide an economical apparatus and an economical method.

BRIEF DESCRIPTION OF DRAWINGS

FIG. 5A is a diagram illustrating a method for calculating a junction temperature of the switching device from a regularly repeated current, i.e., a current in which actual sine waves are approximated by rectangular waves for heat calculation.

FIG. 5B is another diagram illustrating the method for calculating the junction temperature.

DESCRIPTION OF EMBODIMENTS

Hereinafter, an embodiment of the present invention will be described in detail with reference to the drawings.

Figure 1:
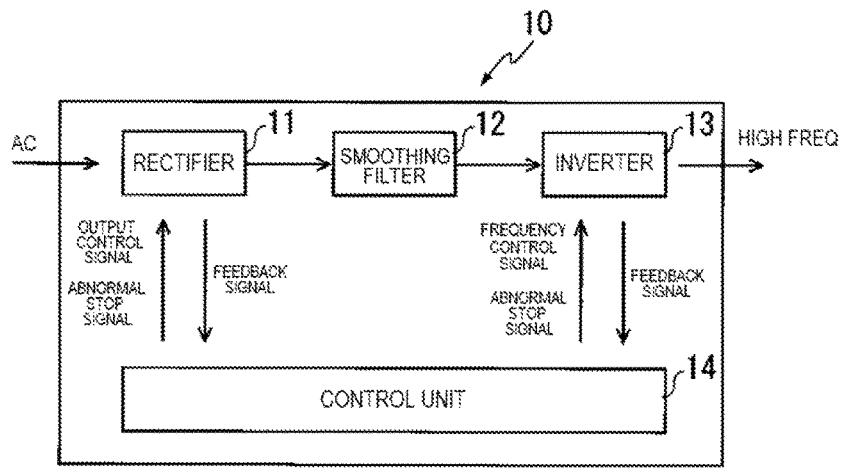
FIG. 1 is a diagram illustrating a configuration of a power conversion apparatus according to an embodiment of the present invention.

FIG. 1 is a diagram illustrating a configuration of a power conversion apparatus 10 for heat treatment. As shown in FIG. 1, the power conversion apparatus 10 includes a rectifier 11 that converts AC power into DC power, a smoothing filter 12 configured to control the DC power received from the rectifier 11 to be constant, an inverter 13 configured to convert the DC power received from the smoothing filter into high-frequency power by turning a switching device at a given frequency power, and a control unit 14 configured to control the rectifier 11 and the inverter 13.

The rectifier 11, also called as a converter, converts the commercial AC power into DC power by rectifying the commercial AC power. The rectifier 11 adjusts the magnitude of the output power of the power conversion apparatus 10 under an output control by the control unit 14.

Where the power conversion apparatus is of a current type, the smoothing filter 12 smoothes out ripples in an electric current output from the rectifier 11 by means of a reactor, and outputs the resulting current to the inverter 13. Where the power conversion apparatus is of a voltage type, the smoothing filter 12 smoothes out ripples in a voltage output from the rectifier 11 by means of a capacitor, and outputs the resulting voltage to the inverter 13.

In the inverter 13, a power semiconductor device serving as a switching device is arranged as a bridge circuit. The power semiconductor device performs switching to convert the DC power into high-frequency power and to output the high-frequency power. Here, an SiC semiconductor device such as an SiC-MOSFET is used as the power semiconductor device. The SiC semiconductor device is advantageous for the following reasons. That is, the SiC semiconductor device has a high switching speed and is of a voltage driven type. The turn-on resistance of the device is so low that the power consumption can be reduced. The withstand voltage of the device is high, and the electric current density of the device is high. Accordingly, a power source itself can be made small in size and light in weight. Thus, the SiC semiconductor device is efficient.

The control unit 14 outputs an output control signal and an abnormal stop instruction signal to the rectifier 11 so as to control the rectifier 11. In addition, the control unit 14 outputs a frequency control signal and an abnormal stop instruction signal to the inverter 13 so as to control the inverter 13. The control unit 14 receives feedback signals from the rectifier 11 and the inverter 13 respectively so that the control unit 14 can detect the states of the rectifier 11 and the inverter 13.

In the embodiment of the invention, the control unit 14 suspends or controls output power from the inverter 13 in accordance with the frequency of high-frequency power output from the inverter 13, the current-applying time and the operation rate. To that end, the control unit 14 has data defining a relationship among the frequency of the switching device, the current-applying time, the operation rate, and the output power at the temperature at which the switching device is operable. When the current-applying time and the operation rate are set, a maximum allowable current can be obtained based on the data. Accordingly, when an output current of the rectifier 11 detected from the electric current feedback signal from the rectifier 11 exceeds the maximum allowable current obtained from the current-applying time, the operation rate and the frequency, the output from the inverter 13 is, for example, suspended or controlled to decrease. Here, the maximum allowable current is calculated from the data defining the relationship among the frequency of the switching device, the current-applying time, the operation rate, and the output power at the temperature at which the switching device is operable. The maximum allowable current is the maximum current that can be applied on those conditions. As a result, the output from the power conversion apparatus 10 in which the maximum power output from the inverter 13, that is, the capacity has been rated is suspended or controlled in accordance with the value of temperature rise caused by the operation of the switching device even when the power conversion apparatus 10 is being operated.

Figure 2:
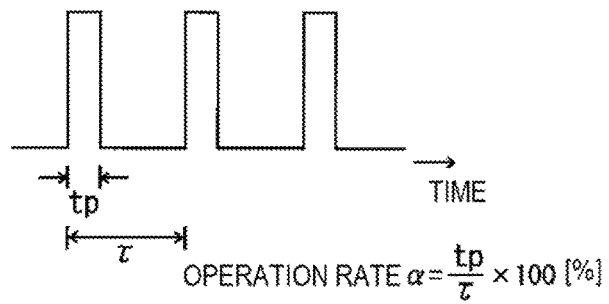
FIG. 2 is a diagram illustrating an operation rate.

FIG. 2 is a diagram illustrating the operation rate α. In FIG. 2, the horizontal axis represents time, and the vertical axis represents output. The operation rate α is given by the following equation.

Operation rate α=current-applying time $tp$/cycle
τ=current-applying time $tp$/(current-applying time+non-current-applying time)

The current-applying time tp is a time during which high-frequency power is output from the inverter 13. The cycle τ is the sum of the current-applying time and the non-current-applying time, i.e., a time period from an output of one pulse to an output of the next pulse.

Figure 3:
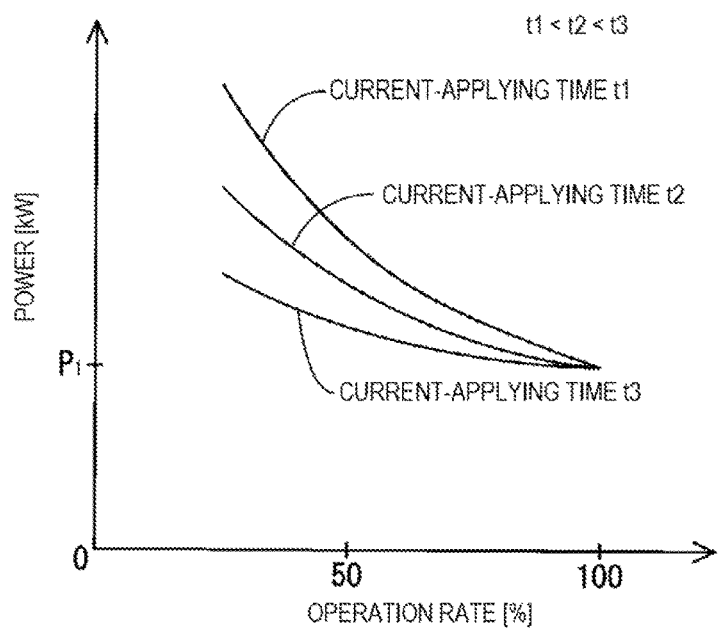
FIG. 3 is a diagram illustrating a part of data stored in a control unit.

The relationship between the operation rate α and the power with a junction temperature rise value ΔTj of the switching device to the current-applying time tp and the frequency is accumulated as data in the control unit 14. FIG. 3 is a graph schematically showing a part of the data accumulated in the control unit 14. The horizontal axis represents the operation rate (%), and the vertical axis represents the power (kW). In the operation rate of 100%, the power is defined as P1, which is the continuous rated power. However, when the operation rate is decreased, the power increases. The amount of increase in power is larger as the current-applying time is shorter. The power (kW) in the vertical axis of FIG. 3 is a value in which a current A for the junction temperature rise value ΔTj of the switching device to frequency is converted to power (kW).

Figure 4A:
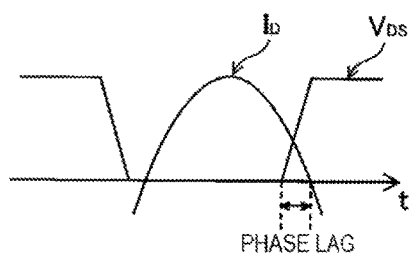
FIG. 4A is a diagram illustrating a design concept of the power conversion apparatus, showing a drain current waveform and a drain-source voltage waveform in a case where a switching device has a MOSFET structure.
Figure 4B:
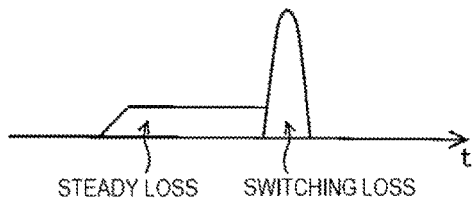
FIG. 4B is another diagram illustrating the design concept of the power conversion apparatus, showing a loss waveform.
Figure 4B:
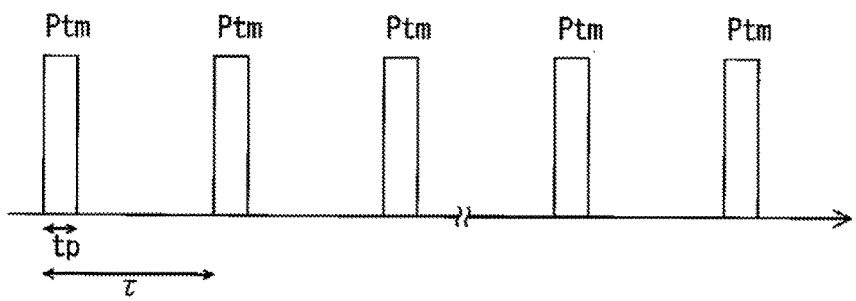
Figure 4B:
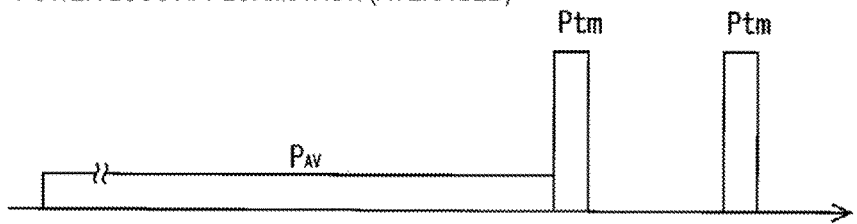

The design concept of the power conversion apparatus 10 according to the embodiment of the invention will be described. FIGS. 4A and 4B illustrate the design concept of the power conversion apparatus 10, FIG. 4A illustrating a drain current $I_D$ waveform and a drain-source voltage $V_{DS}$ waveform in a case where the switching device has a MOSFET structure, and FIG. 4B illustrating a loss waveform. In each graph, the horizontal axis represents time. The rated output of the power conversion apparatus 10 depends on the temperature characteristic of the switching device, and other characteristics such as rated voltage, temperature balance, etc. The temperature of the switching device depends on loss and cooling of the switching device. The loss of the switching device is given by the following equation.

Loss of device=steady loss+switching loss

When the drain current $I_D$ waveform and the drain-source voltage $V_{DS}$ waveform are shown with time expressed in the horizontal axis as shown in FIGS. 4A and 4B, the $I_D$ waveform has a phase lag from the $V_{DS}$ waveform. The switching loss occurs as the product of the $I_D$ waveform and the $V_{DS}$ waveform in the region where the phases of the waveforms overlap each other in this manner.

The steady loss is a loss that is caused by an application of electric current to the switching device, that is, a conduction loss of the switching device, and depends on a value of the electric current applied. On the other hand, the switching loss is proportional to the number of switching (i.e., frequency). Accordingly, even when the same electric current is applied, the switching loss increases and hence the loss of the switching device increases as the frequency becomes higher.

However, in power conversion apparatus sold and used in the background art, any power conversion apparatus whose oscillatory frequency is high or low has been rated at the maximum frequency having the largest loss and on the assumption of continuous running. As a result, a small current is applied though the electric current value can be increased when the frequency of high-frequency power is low. In addition, the temperature rise depends on the operation rate or the current-applying time per one time as well as the operating frequency. That is, rating is determined in no consideration of the fact that there is enough time of cooling the switching device in a case of high frequency quenching or the like in which electric current is not continuously applied but applied only for a very short time from several seconds to several tens of seconds.

In the embodiment of the invention, therefore, rated output power is determined for each frequency in consideration of the cooling time of the switching device based on the current-applying time and the operation rate. That is, an amperage in which the junction temperature will not exceed a predetermined value is obtained for each oscillatory frequency of the power conversion apparatus based on the characteristics of the switching device used in the inverter 13 and in accordance with the current-applying time tp and the operation rate $\alpha$. Thus, the output power is obtained. The control unit 14 stops the operations of the rectifier 11 and the inverter 13 to suspend the output from the inverter 13 when the output current from the inverter 13 exceeds a reference current value. In this manner, the output of the power conversion apparatus is rated for each frequency in consideration of the operation rate and the current-applying time so as to be segmented for each frequency. Thus, it is possible to make good use of remaining power when the value of the frequency is small.

In the power conversion method for heat treatment according to the embodiment of the invention, AC power is temporally converted to DC power, and the DC power is turned on and off by the switching device to further convert the DC power into high-frequency power. The maximum output power is increased in accordance with the converted frequency, the current-applying time, and the operation rate obtained by dividing the current-applying time by the sum of the current-applying time and the non-current-applying time, such that the junction temperature of the switching device does not exceed a given temperature.

The junction temperature of the switching device can be obtained from a difference between the temperature increase due to the loss of the switching device and the temperature decrease due to cooling of the switching device. The maximum output power is increased until the upper limit of the junction temperature reaches a value within the rating of the switching device. Accordingly, economical heat treatment can be attained. Particularly, the current-applying time in which a current is applied to the switching device is much shorter than the time of replacing or setting a heat treatment target. Thus, the economic efficiency becomes conspicuous.

As previously described, the loss of the device is the sum of the steady loss and the switching loss. The steady loss depends on the electric current, and the switching loss depends on the electric current and the voltage. Therefore, the loss of the device depends substantially on the electric current. FIG. 3 shows results calculated in consideration of both the electric current dependency and the voltage dependency. In FIG. 3, the data accumulated in the control unit 14 are expressed by power (kW). However, the data may be expressed by the electric current (A).

Figure 5C:
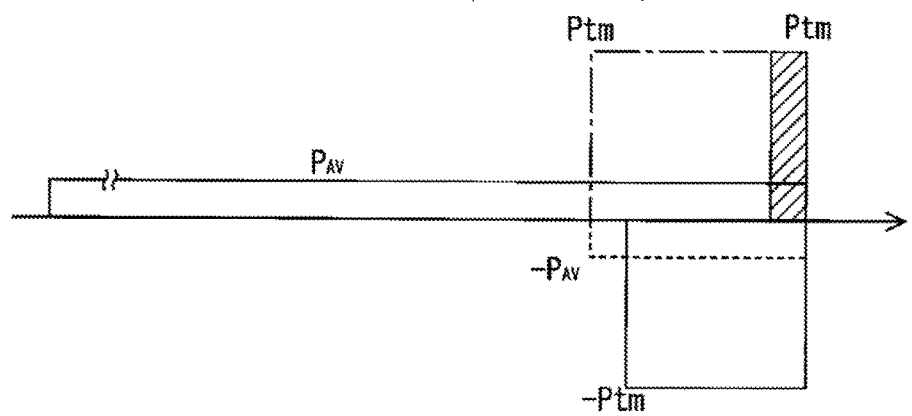
FIG. 5C is another diagram illustrating the method for calculating the junction temperature.

Next, description will be made on an example of the manner for calculating a current value as reference with which the control unit 14 stops the output. FIGS. 5A to 5C are diagrams illustrating a method for obtaining a junction temperature of the switching device from a regularly repeated current, that is, a current in which actual sine waves have been approximated by rectangular waves for heat calculation. When the current-applying time with a power loss Ptm is tp and the frequency is $\tau$ as shown in FIG. 5A, pulses other than the last two pulses are averaged to approximate the power loss as shown in FIG. 5B. A superposition principle is applied to the power loss as shown in FIG. 5C. Thus, a temperature rise is obtained.

It has been known that the junction temperature Tj of the switching device can be obtained from a regularly repeated rectangular current by the following equation.

$$Tj=Tw+Ptm\{(tp/\tau)\cdot R(j-w)+(1-tp/\tau)\cdot R(j-w)(\tau+tp)-R(j-w)(\tau)+R(j-w)(tp)\}$$

This equation is modified as follows.

$$Tj-Tw=(T\infty+T3-T2+T1)\cdot Ptm$$

$$T\infty=(tp/\tau)\cdot R(j-w)$$

$$T3=(1-tp/\tau)\cdot R(j-w)(\tau+tp)$$

$$T2=R(j-w)(\tau)$$

$$T1=R(j-w)(tp)$$

T$\infty$ means that the loss Ptm occurs with the current-applying rate tp/$\tau$ for infinite time, and is given by a thermal resistance at the time of a continuous rating multiplied by the current-applying rate tp/$\tau$.

T3 means that a part corresponding to the current-applying rate tp/$\tau$ is subtracted from the loss of the time ($\tau$+tp).

−T2 means that a loss in a time $\tau$ is subtracted.

T1 means that a loss in a time tp is added.

$\tau$ denotes the cycle time, and R(j−w)(t) denotes a transient thermal resistance (° C./W) of a time t. Tw denotes the temperature (° C.) of cooling water.

The junction temperature Tj is calculated in the manner described above. When the junction temperature of the switching device of the inverter 13 reaches the reference value, the control unit 14 suspends the operation of the rectifier 11 and the inverter 13 and thus controls the output. This is because when the switching device is operated, loss is produced by applying the electric current, and when the junction temperature becomes higher than the reference temperature, the switching device might be broken. The loss is, for example, obtained from the sum of a steady loss and a switching loss which are calculated in the following manner.

The steady loss is obtained by measuring a loss of a certain current, and by multiplying the measured loss by an increase rate of loss due to an increase in electric current and an increase rate of loss of the device due to the increase in electric current. The switching loss is obtained by measuring a switching loss per 1 kHz, and by multiplying the measured switching loss by a frequency and by considering of the increase in electric current. The sum of the steady loss and the switching loss multiplied by T$\infty$+T3−T2+T1 described above is made to be not higher than a given temperature.

The give temperature is determined based on the switching device to be used. Thus, by determining the electric current ("reference current") that satisfies the above relationship, the output can be increased within a range in which the electric current flowing in the switching device does not exceed the reference current.

Figure 6A:
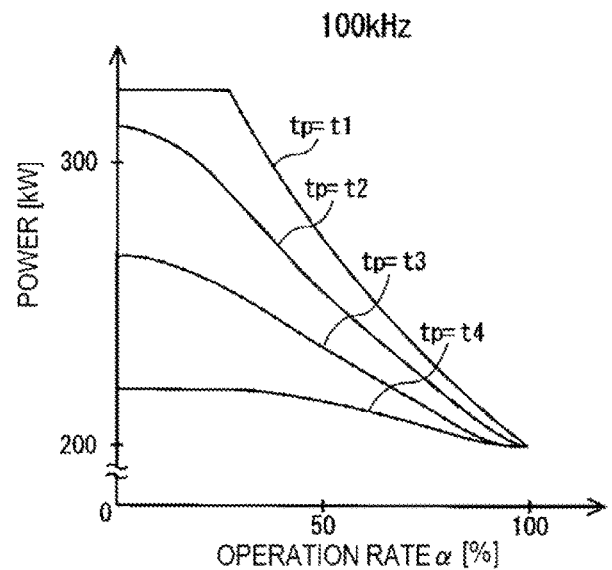
FIG. 6A is a diagram illustrating data stored in the control unit, showing relationships between an operation rate and power at frequency of 100 kHz, with a current-applying time being a parameter.
Figure 6B:
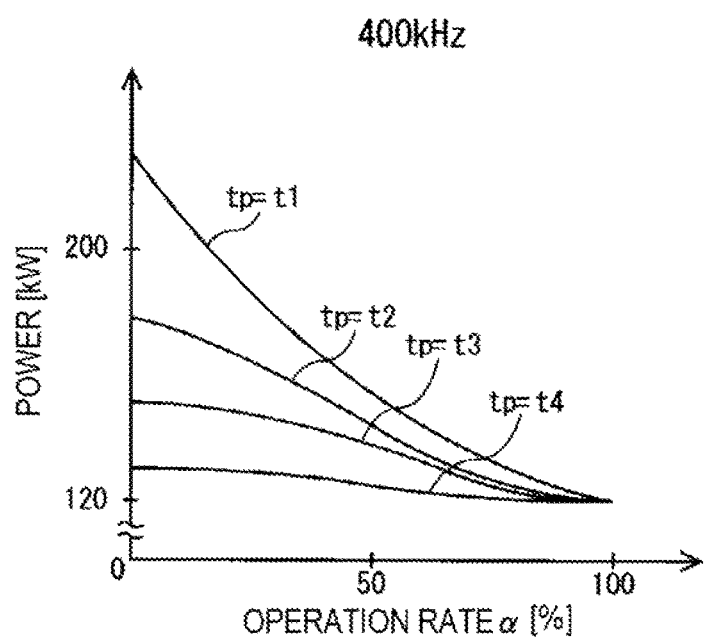
FIG. 6B is another diagram illustrating data stored in the control unit, showing relationships between the operation rate and power at frequency of 400 kHz, with the current-applying time being the parameter.

Results obtained by the aforementioned manner will be described. FIGS. 6A and 6B are diagrams illustrating the data accumulated in the control unit 14. FIGS. 6A and 6B illustrates the relationship between the operation rate α and the power at frequencies of 100 kHz and 400 kHz respectively using the current-applying time tp as a parameter. The relation of t1<t2<t3<t4 is satisfied among t1 to t4, which are values of tp.

When high-frequency power whose frequency is 100 kHz is output in the power conversion apparatus for heat treatment, rating is determined as shown in FIG. 6A. When the operation rate α drops down, the power can be increased. In addition, the output power can be changed in accordance with the operation rate when the current-applying time tp is t2, t3 or t4.

When high-frequency power whose frequency is 400 kHz is output, rating is determined as shown in FIG. 6B. When the operation rate α drops down, the power can be increased. In addition, the output power can be changed in accordance with the operation rate when the current-applying time tp is t1, t2, t3 or t4.

In a power conversion apparatus based on the same design concept, output power can be changed in accordance with a frequency within its rated output power, so that more power can be output for low frequency waves.

Accordingly, in the power conversion apparatus according to the embodiment of the invention, individual rating is set for each output frequency. In the background art, rating of a power conversion apparatus for a high frequency is the same as rating of the power conversion apparatus for a low frequency. On the other hand, according to the embodiment of the invention, rating for a low frequency can be increased in accordance with the rating of the power conversion apparatus so as to enhance the economic efficiency. In addition, it may be necessary to replace components of the rectifier 11, the inserter portion 13 and the control unit 14 or change the constants of the components in accordance with the output frequency. In such a case, such fine adjustment may be performed by changeover on a switch, so that the oscillatory frequency can be changed.

While the present invention has been described with reference to a certain embodiment thereof, the scope of the present invention is not limited to the embodiment described above, and it will be understood by those skilled in the art that various changes and modifications may be made therein without departing from the scope of the present invention as defined by the appended claims.

The rating of power output from the inverter 13 is determined in accordance with a frequency of high-frequency power output from the inverter 13, a current-applying time, and an operation rate obtained by dividing the current-applying time by the sum of the current-applying time and a non-current-applying time, and is set by adjusting at least one of the frequency, the current-applying time and the operation rate. That is, the rating may be set by adjusting only one of these three parameters, or may be set by adjusting two of the parameters without changing one of the parameters. Alternatively, the rating may be set by adjusting all the three parameters.

This application is based on Japanese Patent Application No. 2015-123337 filed on Jun. 18, 2015, the entire content of which is incorporated herein by reference.

The invention claimed is:

1. A power conversion apparatus for heat treatment, the power conversion apparatus comprising:
   a rectifier configured to convert AC power to DC power;
   a smoothing filter configured to control the DC power received from the rectifier to be constant;
   an inverter configured to convert the DC power received from the smoothing filter into high-frequency power by turning the DC power on and off using a switching device made of an SiC semiconductor; and
   a control unit configured to control the rectifier and the inverter,
   wherein a rating of output power output from the inverter is determined in accordance with a frequency of the high-frequency power output from the inverter, a current-applying time which is a time to output the high-frequency power from the inverter, and an operation rate obtained by dividing the current-applying time by a sum of the current-applying time and a non-current-applying time.

2. The power conversion apparatus according to claim 1, wherein the control unit has data defining a relationship among a frequency of the switching device, the current-applying time, the operation rate, and the output power at a temperature at which the switching device is operable, and when the current-applying time and the operation rate are given, the control unit calculates a maximum allowable current based on the data and suspends or controls the output power.

3. A power conversion method for heat treatment, the power conversion method comprising: converting AC power into DC power, power; converting the DC power into high-frequency power with an inverter by turning the DC power on and off using a switching device made of an SiC semiconductor; and increasing maximum output power in accordance with a frequency of the high-frequency power, a current-applying time which is a time to output the high-frequency power from the inverter, and an operation rate obtained by dividing the current-applying time by a sum of the current-applying time and a non-current-applying time, such that a junction temperature of the switching device does not exceed a given temperature.

4. The power conversion method according to claim 3, wherein the maximum output power is increased until an upper limit of the junction temperature of the switching device reaches a designed value within a rating of the switching device, the junction temperature being obtained from a difference between a temperature increase due to a loss of the switching device and a temperature decrease due to cooling of the switching device.

5. The power conversion method according to claim 4, wherein the loss of the switching device is determined based on a sum of a conduction loss of the switching device and a switching loss of the switching device.

* * * * *